UNITED STATES PATENT OFFICE.

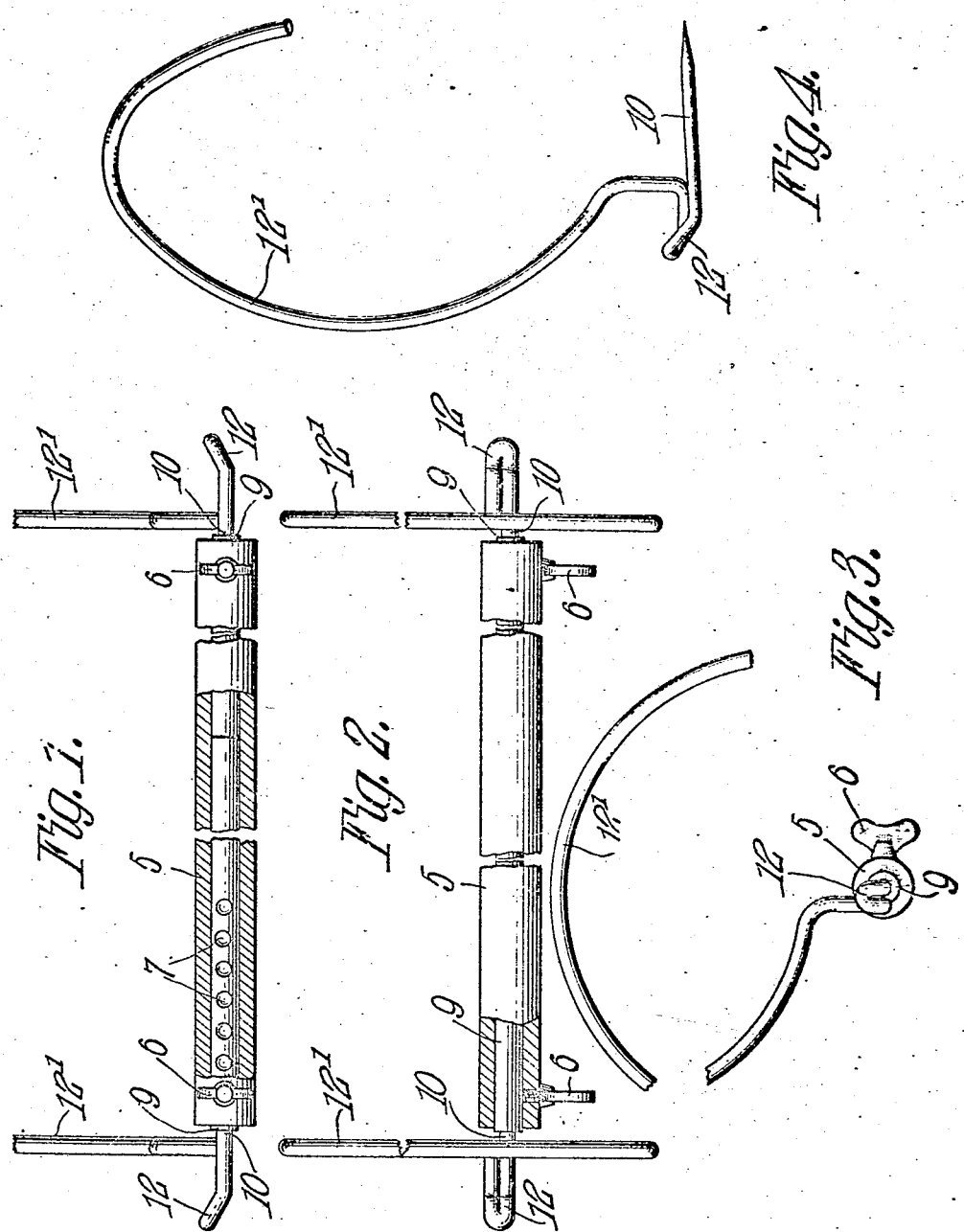

HENRY E. GARLOCK, OF STOCKTON, IOWA.

HOG-HANGER.

No. 895,249.

Specification of Letters Patent.

Patented Aug. 4, 1908.

Application filed March 27, 1908. Serial No. 423,597.

*To all whom it may concern:*

Be it known that I, HENRY E. GARLOCK, a citizen of the United States, residing at Stockton, in the county of Muscatine, State of Iowa, have invented certain new and useful Improvements in Hog-Hangers; and I do hereby declare the following to be a full, clear, and exact description of the invention, such as will enable others skilled in the art to which it appertains to make and use the same.

This invention has relation to a new and useful improvement in hog hangers, the object of the invention being, to provide a simple hanger having suspending hooks and connected meat hooks, arranged so that carcasses may be conveniently and properly suspended, for display purposes or while dressing or cutting the same.

In the accompanying drawings, Figure 1 shows a side view of a hanger embodying my invention and partly in section. Fig. 2 is a top view also partly in section. Fig. 3 is an end view, and Fig. 4, a detailed perspective view of one of the combination hooks, as used in my invention.

The purposes of this invention are, to provide a hanger so constructed, that the same may be adjusted lengthwise, to receive in a suspended form the carcasses of pigs and hogs, though the same may of course also be used in suspended sheep, calves and the like.

In carrying out the aim of my invention, I provide a tubular member 5, of a suitable size and length, which near each end is perforated, these perforations being threaded to receive the set screws 6, 6, as clearly shown in Fig. 1. Slidably held within this tubular member 5 are the two similar bars 9, 9, these bars being provided with the perforations 7 adapted to receive the end of the set screw 6 to positively hold the member within the housing. As shown in Fig. 1 two such slidably held bars are employed. Secured within each of these slidably held bars is a suspending member comprising a combination meat hook and suspending hook. This suspending member embraces a tang 10 which is in the form of a single piece of preferably round metal continued and bent upon itself, as is shown at 12, to form the meat suspending hook, this hook being angled slightly upward as shown, and then being continued at right angles and recurved to form the suspending hook 12', as clearly shown in Fig. 3. The tang of this combination hook is securely driven into one end of the bar 9, it being understood that there are two bars and suspending hooks used.

By this means I provide a meat hanger of the class described so constructed that the hanger will be held against any tipping movement so that the carcass may be dressed or cut in two without danger of the carcass dropping off of the hanger. This construction method provides a hanger by means of which porkers of a very small size can be properly suspended, while the adjusting means at the same time permit the hanger being drawn out and secured to meet the conditions as they exist when a full size hog is to be suspended. The suspending hook it will be noticed is immediately adjacent the carcass supporting hook 12 so that absolutely no strain is placed upon the housing 5. This device forms a neat, light and simply constructed hanger arranged to meet all conditions to which such a device is subjected.

And having thus described my said invention, what I claim as new and desire to secure by U. S. Letters Patent is—

1. A device of the class described comprising a tubular housing, two bars slidably engaging said housing and projecting from its ends, set screws operating through said housing and engaging said bars, a hook extending from the end of each bar and substantially in longitudinal alinement therewith, and a suspension element extending vertically from each of said hooks.

2. In a device of the class described, a tubular housing, two bars slidably engaging said housing and projecting from its ends, and a combined hook and suspension element formed from a single rod each inserted by one end into the outer ends of each bar and bent upon itself adjacent to the bar to form a hook and thence extended vertically and terminating in a suspension hook at right angles to the housing.

3. A hanger comprising a tubular member having a threaded opening at each end, a set screw carried in each opening, two slidably held members within said tube, and a combination suspending and meat hook secured to each of said slidably held members, each hook being made of a single piece of metal having a securing tang, and a portion bent
5 upon itself to form a meat hook slightly tilted upward, the metal being continued and bent to form a suspending hook, all arranged substantially as and for the purpose set forth.

In testimony whereof, I affix my signature, in presence of two witnesses.

HENRY E. GARLOCK.

Witnesses:
　RUD. BLANK,
　F. A. GARLOCK.